United States Patent

[11] 3,588,643

| [72] | Inventors | Sidney D. Ross<br>Williamstown, Mass.;<br>Franklin D. Frantz, Woodford, Vt. |
|---|---|---|
| [21] | Appl. No. | 875,845 |
| [22] | Filed | Nov. 12, 1969 |
| [45] | Patented | June 28, 1971 |
| [73] | Assignee | Sprague Electric Company<br>North Adams, Mass. |

[54] COATED IMPREGNATED CAPACITOR
8 Claims, 2 Drawing Figs.

[52] U.S. Cl. ............................................. 317/258,
317/260
[51] Int. Cl. ............................................. H01g 1/02
[50] Field of Search ............................................. 317/258;
1/260

[56] References Cited
UNITED STATES PATENTS
3,346,789  10/1967  Robinson .................... 317/258

*Primary Examiner*—E. A. Goldberg
*Attorneys*—Connolly and Hutz, Vincent H. Sweeney, James Paul O'Sullivan and David R. Thornton ABSTRACT: A convolutely wound metallized capacitor, fully impregnated with a liquid dielectric, is treated with a polyisocyanate such that the impregnant on the surface of the capacitor section is subjected to a nonradical reaction so as to provide a tough polymer skin of controlled thickness around the section. The preferred impregnant is castor oil which is reacted with a polyisocyanate to form the skin.

PATENTED JUN 28 1971  3,588,643

COATED IMPREGNATED CAPACITOR

BACKGROUND OF THE INVENTION

This invention relates to coated impregnated capacitors, and more particularly to a liquid impregnated capacitor having a compatible coating around the capacitor.

It is known to the capacitor art that capacitor sections which are impregnated with liquid dielectrics attain high insulation resistance. It is also known to the art that the containment of liquid impregnants is expensive and offers opportunity for contamination of the impregnant. It has been suggested in the art that a capacitor section could be impregnated with a liquid dielectric which is capable of forming a skin around the surface of the section. Varnishes and drying oils, including dehydrated castor oil, have been found to skin over sufficiently on air oxidation to contain the liquid dielectric within the section.

This auto-oxidation has not been entirely satisfactory because it involves a free radical chain reaction which is subject to variation by the presence of only trace quantities of desirable materials, such as stabilizers, within the capacitor section. Auto-oxidants are also difficult to employ on a commercial scale because of the housekeeping problems of maintaining the process equipment free of oxidized coatings.

The dusting of the surface of a castor oil impregnated section with an alkaline earth oxide, such as calcium oxide is also known in the prior art. In this case, the reaction involved is the conversion of the free acid present in the oil impregnant to a salt or soap. The reaction occurs with the free acid and not with the oil itself which is a glyceride. Since the free acid is deleterious to the capacitor in that it lowers the resistivity of the oil, increases leakage currents and can eventually cause serious degradation of the dielectric, it is common practice to purify the castor oil to remove free acid almost completely. Such purified oil will not significantly react with an alkaline earth oxide. Moreover, even under conditions where there is enough free acid for reaction, the product provides a poor protective coating which is subject to moisture attack etc.

SUMMARY OF THE INVENTION

It is an object of this invention to provide a capacitor section which is impregnated with a liquid dielectric having a reaction skin wherein the section is not subject to the foregoing and related disadvantages of the prior art.

Another object is the provision of a liquid impregnated capacitor section having a controllable skin which is independent of trace quantities of stabilizers and the like within the section.

In accordance with this invention a convolutely wound capacitance section is fully impregnated with a liquid dielectric containing free hydroxyl groups and the surface of the impregnated section is enclosed within polymer formed of a reaction product of the impregnant and a polyisocyanate in a nonradical reaction.

In general, the coated impregnated capacitor of this invention has a convolutely wound capacitance section which is fully impregnated by a liquid dielectric. The unit is treated with a material which reacts with the liquid dielectric on the surface of the section to produce a skin around the section. Preferably, the section is impregnated with a polymer or oil containing free hydroxyl groups, and is reacted with a polyisocyanate to form the skin around the section.

The preferred embodiment of the invention involves a convolutely wound section of doubly metallized paper electrodes which are separated by nonporous film dielectrics. It has been found that castor oil can fully impregnate such a section, and that the reaction of castor oil and a polyisocyanate proceeds independently of any stabilizers, inhibitors, scavengers, or other impregnant additives, desirable in capacitor constructions.

DESCRIPTION OF THE PREFERRED EMBODIMENTS

Figure 1:
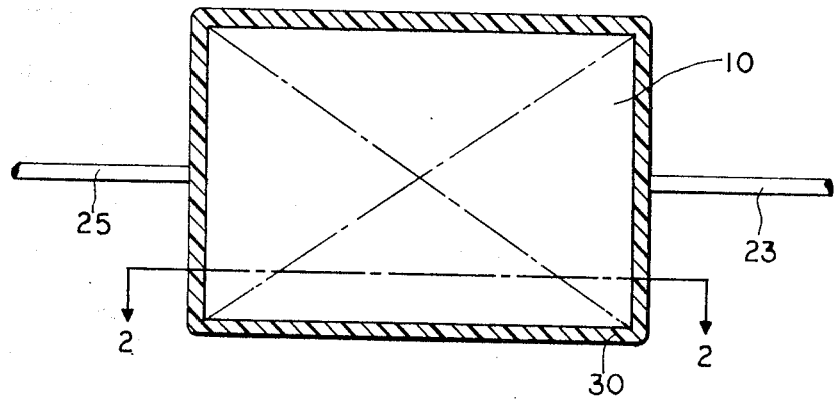
FIG. 1 is a diagrammatic cross section of a capacitor of this invention.

FIG. 1 shows a capacitor section 10 having leads 23 and 25 extending therefrom. A polymer coating 30 extends completely around the section 10 to seal the section against loss of liquid impregnant therefrom. The coating or skin 30 is a reaction product of the impregnant and a polyisocyanate, and is of a nature to permit utilization of the capacitor without further casing. Additionally, coating 30 permits adherent bonding of additional resin encasements where required by the demands to be placed upon the capacitor.

Figure 2:
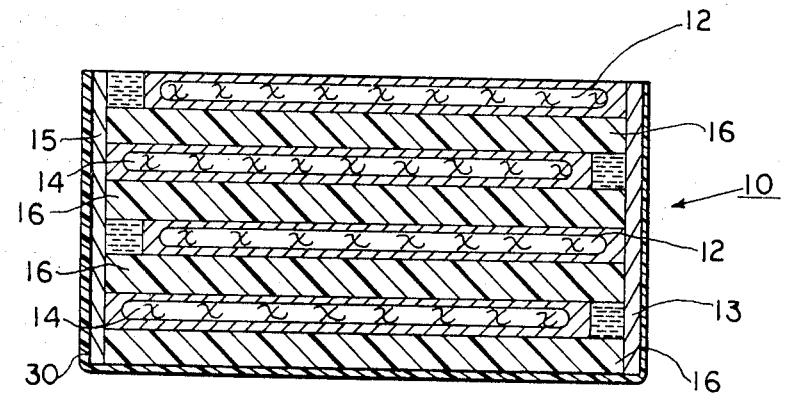
FIG. 2 is a fragmentary cross section taken along the line 2-2 of FIG. 1.

The capacitor of FIG. 1 is shown in greater detail in the fragmentary cross section of FIG. 2. Capacitor section 10 utilizes electrodes 12 and 14 which are convolutely wound with and separated by plastic films 16. Section 10 is wound in extended foil fashion whereby an edge of electrode 12 extends from one end of the section, and an edge of electrode 14 extends from the opposite end. The extended edges of electrode 12 are joined by conductive termination 13, such as solder or the like, and the edges of electrode 14 by a similar conductive termination 15. The lead-wires 23 and 25 are conductively attached to terminations 13 and 15, respectively.

In the preferred embodiment, electrodes 12 and 14 are porous paper strips which have been metallized on both surfaces to provide a unitary electrode in which the paper is out of the electrical field and functions solely as a support which is capable of impregnation. The construction of electrodes 12 and 14 and the winding of section 10 with films 16 is described in greater detail in U.S. Letters Pat. No. 3,346,789.

Section 10 is fully impregnated with castor oil 18 including the electrodes 12 and 14 as well as all interstices in the winding. Castor oil has been recognized as a superior dielectric impregnant for many electrical requirements and is particularly advantageous in metallized capacitors because its high degree of oxygenation enhances nondestructive clearing or "self-healing" of the thin metal layers upon scintillation. However, the containment of castor oil within a section has long posed a problem requiring the use of expensive and time consuming encasements.

The formation of skin 30 around section 10 is accomplished by dipping the fully impregnated section into a mixture of castor oil and a polyisocyanate, a castor oil-polyisocyanate adduct, or into an isocyanate adduct of an oil other than castor oil, e.g. a polyether.

In the novel structure, possible leakage of the dielectric during the life of the unit may be inhibited by using a stoichiometric excess of isocyanate groups (i.e. more moles isocyanate than moles hydroxyl groups on the capacitor surface). Hence, there will be a reservoir of reactive isocyanate groups available to react with and immobilize any further castor oil that may make its way to the surface.

Skin thickness on the cylindrical surfaces of the section (FIG. 1) has only secondary importance as a protective or stress relief coating. An adequate coat of isocyanate reactable skin former must be present at the edge of the winding where the castor oil impregnant will accumulate. This skin will function as a seal against weeping of the impregnant and prevent loss of the protecting dielectric at the foil edges. Fortunately, at the edges of the windings, surface tension and surface roughness assist maximum retention of the applied polyisocyanate, and this is the location where it is most needed. A thickness of coating necessary to fill the convolutions at the section ends is suitable.

In manufacturing, when the capacitor sections come from impregnation, there is often an uneven and excess amount of impregnant on the cylindrical surfaces which gives an uneven gel when treated with isocyanate. This difficulty can be circumvented by applying the isocyanate from solution such that sufficient isocyanate is deposited and excess castor oil is removed to the solution. If the exposure time is not excessive, there will be no significant penetration of solvent into the ends of the convolutely wound section.

In the preferred embodiment, the sections were dipped in meta tolylene diisocyanate-castor oil adduct dissolved in a mixed hydrocarbon and ester solvent (hexane and ethyl acetate) and containing stannous octoate as an electrically harmless polymerization accelerator. The sections were subsequently cured at temperatures below 60°, C since excessive curing temperatures can cause oozing of the impregnant before the sealing skin is formed.

Other accelerators may also be employed to enhance skin formation, for example a commercial polyether-isocyanate adduct with an accelerator, such as tetrabutyl titanate is suitable. This accelerator has the advantage that its life and presence is limited by the small amounts of moisture normally present in air inasmuch as it reacts rapidly with atmospheric moisture to give inert, harmless products. Advantageously, the use of accelerators permits rapid curing in the preferred 40°—60° C temperature range. Of course, the accelerator should be electrically harmless, as in the case, of the given examples above.

The in situ reaction on the section 10 of the impregnant and the polyisocyanate is a nonradical reaction which is easily controlled and is independent of the use of stabilizers, inhibitors and scavengers within the impregnated section. Inhibition of castor oil dielectric in capacitors is described in U.S. Letters Pat. No. 2,935,667. The heavy concentration of reactive castor oil in coating 30 and the completeness of the reaction ensure against any deleterious reaction taking place between the coating and the castor oil used for impregnation of section 10.

Although castor oil is the preferred impregnant 18 for the capacitor of this invention, other liquid dielectric materials such as any polymer or oil containing free hydroxyl groups can provide advantageous results when employed to impregnate the section and to react with a polyisocyanate to form a skin around the section. Some examples of such oils that are suitable are hydroxy terminated polybutadiene, hydroxy terminated styrene butadiene copolymer and only partially dehydrated castor oil.

The sealed capacitor section also lends itself to further encapsulation, for example, oxygenated polymer coatings will be compatible with skin 30 and provide suitable adhesion. This follows since the reaction between an isocyanate and a hydroxyl group results in the formation of a carbamate linkage,

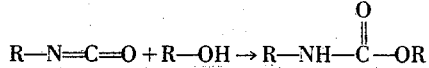

the carbamate linkage is polar and will interact with oxygenated polymers such as epoxies, urethanes, phenolics etc..

Although double-metallized porous electrodes constitute the preferred embodiment of this invention it should be understood that the invention is useful in conventional metallized paper capacitors. Indeed, the invention finds limited success in ordinary foil and paper capacitor sections.

EXAMPLE I

Several convolutely wound capacitance sections made up in extended foil fashion with metallized kraft paper electrodes separated by plastic dielectric strips and having sprayed solder terminations at each end were vacuum impregnated in a conventional manner with castor oil. The excess castor oil impregnant was drained off, and the units were then dipped for one minute into a polyisocyanate of the following composition:

Castor oil DB 5 g.
Meta tolylene diisocyanate 2.65 g.
Hexane 5.0 g.
Ethyl acetate 7.5 g.

Immediately thereafter, the units were dipped for approximately one minute in an accelerator of the following composition:

Stannous octoate .5 ml.
Hexane 50 g.

The units were then cured at 40° C. for 8 hours. This provided a capacitance section having a tough polymer outer skin.

EXAMPLE II

Several sections prepared and impregnated as in Example I above, were dipped for approximately one minute in a mixture of a paratolylene diisocyanate adduct of glycol-polyether having an isocyanate content of 4.10 and a viscosity of 14,000 to 19,000 c.p.s. as follows:

Diisocyanate adduct 20 g.
Ethyl acetate 100 g.
Tetrabutyl titanate 7 drops

The units were then cured overnight in an oven at 60° C.
This produced units having a tough polymer skin.

We claim:

1. A coated impregnated capacitor comprising a convolutely wound capacitor section having metallized electrodes, said section being fully impregnated with a liquid dielectric, and said section having a polymer skin of a reaction product of said liquid dielectric and a polyisocyanate.

2. The capacitor of claim 1 wherein said electrodes are doubly metallized porous electrodes.

3. The capacitor of claim 2 wherein said electrodes are separated by plastic dielectric films.

4. The capacitor of claim 3 wherein said polyisocyanate includes a polymerization accelerator.

5. The capacitor of claim 3 wherein said liquid dielectric is an oil containing free hydroxyl groups.

6. The capacitor of claim 5 wherein said liquid dielectric is castor oil and said polyisocyanate is a castor oil-polyisocyanate adduct.

7. The capacitor of claim 5 wherein said polyisocyanate is meta tolylene diisocyanate-castor oil adduct dissolved in mixed hydrocarbon and ester solvent and containing stannous octoate.

8. The capacitor of claim 5 wherein said polyisocyanate is a polyether-isocyanate adduct having tetrabutyl titanate as an accelerator.